United States Patent [19]
Lauffer

[11] 3,707,929
[45] Jan. 2, 1973

[54] PALLET
[75] Inventor: Fred E. Lauffer, Toledo, Ohio
[73] Assignee: Owens-Illinois, Inc.
[22] Filed: May 28, 1971
[21] Appl. No.: 148,025

[52] U.S. Cl. .................................................108/51
[51] Int. Cl. ............................................B65d 19/00
[58] Field of Search.....................108/51–58; 214/16; 294/67

[56] References Cited

UNITED STATES PATENTS

| 3,330,228 | 7/1967 | Donnelly | 108/51 |
| 1,993,237 | 3/1935 | Barrett | 108/58 |
| 3,093,092 | 6/1963 | Martin et al. | 108/57 X |
| 3,157,423 | 11/1964 | Brie, Sr. | 294/67 |
| 3,167,341 | 1/1965 | Higgins | 294/67 |
| 3,240,364 | 3/1966 | Kapnek et al. | 108/56 X |

Primary Examiner—Bobby R. Gay
Assistant Examiner—Glenn O. Finch
Attorney—E. F. Dwyer and E. J. Holler

[57] ABSTRACT

A pallet for use in a flow rack loading system, wherein the pallet is mounted on guide tracks, said pallet having a platform comprising a crenelated reinforcing deck and a pair of supporting pads, integrally attached to the deck and positioned beneath the platform, offset from the corresponding platform edges, the pads having a sloping wall for contact with the guide track, and a plate positioned on the lower surfaces of the platform in each of the area between the bases and the corresponding platform edge for positioning the pallet on the guide tracks of the loading rack.

1 Claim, 6 Drawing Figures

PATENTED JAN 2 1973 3,707,929

INVENTOR.
FRED E. LAUFFER

INVENTOR.
FRED E. LAUFFER

INVENTOR.
FRED E. LAUFFER

PALLET

BACKGROUND OF THE INVENTION

A pallet for use in a gravity feed rack type of warehousing system, the pallet having a platform, a pair of pads integrally connected to the platform and positioned beneath the platform, the pads having one sloping wall and a pair of plates positioned beneath the platform for supporting the pallet on the tracks of the rack system and a pair of guides so when the pallet is propelled by the forces of gravity, each sloping side of the pad provides lateral positioning on the track and the plates on the bottom of the platform support and position the pallet on a track of the racks.

DESCRIPTION OF THE PRIOR ART

Pallets utilized in rack loading warehousing operations are supported on tracks, which form a network for moving pallets.

This invention provides a pallet having a crenelated reinforcing member and a pair of pads spanning the crenelations, and pads providing for both vertical and lateral positioning of the pallet on the tracks of the rack, and supporting the pallet on the track.

SUMMARY OF THE INVENTION

Rack loading of pallets on tracks in warehousing operations provides a pallet for moving heavily loaded pallets within the warehouse and from the warehouse to desired shipping or manufacturing locations. The pallet of this invention provides a positioning means for both supporting the pallet on the track of the warehouse storage racks and for utilizing the supporting pads for guiding the pallet along the track as it is moved over the track. Some tracks may be slightly tilted from the vertical to utilize the forces of gravity to aid and assist the movement of the pallet, and pallets may be automatically directed and controlled in their movements. Prior art pallets were positioned on and above the tracks in the manner of a railway car riding upon the upper surfaces of the tracks. Lower surfaces of the platform of this pallet provide both a track contracting and load-bearing surface, for supporting the pallet on the track, and the bases of the pallet, each with a sloping side, positions the pallet between the tracks. The pads provide means for supporting surfaces such as a floor or other supporting part when the pallet is handled by conventional fork lift trucks and stacked on a floor or other non-rack support.

DESCRIPTION OF THE PREFERRED EMBODIMENTS

This invention is a pallet for use in a "gravity flow rack." A flow rack utilizes the force of gravity to propel a pallet along guide tracks of a rack.

Figure 1:
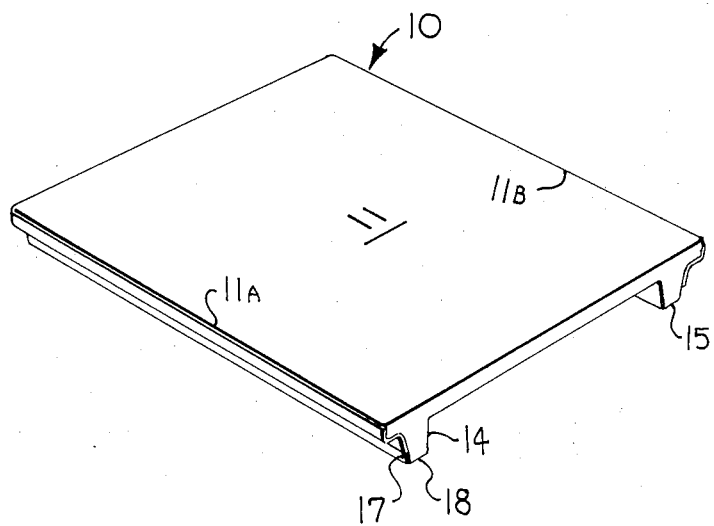
FIG. 1 is a perspective view of the pallet.

FIG. 1 shows the construction of pallet 10 comprising a load bearing platform 11, having a pair of parallel edges 11A and 11B and top surface 12 and bottom surface 13.

The pallet has an internal structure, called a reinforcing member 27, which is capable of providing support for loads of up to 3,000 pounds when the pallet is supported along its edges in an automatic warehousing system of racks and transporters. The reinforcing member 27 comprises a sheet material, having a plurality of crenelations, the crenelations 28 running at a perpendicular angle to the supporting pads, which are integrally attached to the crenelated support.

Figure 2:
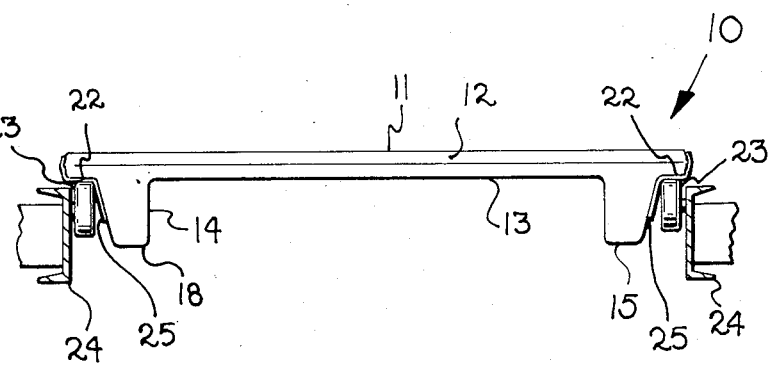
FIG. 2 is an end view of the pallet and a cross section of a rack loading track.

Pads 14 and 15 are positioned along one pair of edges on bottom surface 13 of the platform, perpendicular to the crenelations and positioned in a generally parallel and also spaced relationship, each pad being offset a distance from its corresponding edge of the pallet, as shown in FIGS. 1 and 2.

Pad 14 has three surfaces, sidewall 16, sloping wall 17, and bottom panel 18, the bottom panel connecting the sidewalls. Pad 15 has sidewall 19, sloping wall 20, and bottom panel 21. One sidewall of each pad is sloped and intersects its bottom panel and the platform at an angle other than the perpendicular.

Figure 3:
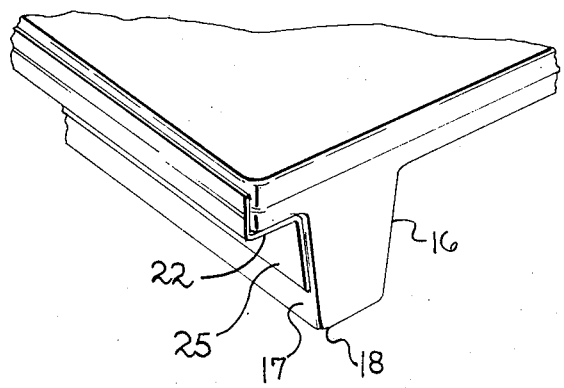
FIG. 3 is an enlarged perspective view showing the plates and guides on the pallet.

FIG. 3 illustrates the positioning of the pallet in a rack system.

Rollers 23 form a path of travel or tracks and are positioned on channels 24. Plates 22 are positioned on the bottom surface 13 of the platform and rest on the supports 23 and provide a continuous contact area for the supports 23. When pallet 10 is positioned on the track, pads 14 and 15 are positioned between the tracks 23. Each sloping wall 17 and 20 has a guide 25 positioned along the wall. Pallet 10 is positioned on the track, guides 25 are between the track and are contactable with the inner surfaces of the wheels 23, the pallet resting on the bottom surface 12 of platform 11. Pallet 10 is enclosed in plastic wrapper 30.

Guides 25 are positioned along each sloped wall serving both to protect the plastic cover from buffeting caused by the pallets scraping against the guide walls, and as a means to guide the pallet along the track. The sloped surfaces 17 and 20 slide relative to the wheels 23 of the support track; and sloped walls of the pad level the pallet relative to the track, as the load increases thereon, and also to guide the pallet in response to contact with the wheels.

A portion of the bottom of the platform in the area between the base and the edge provides surface for contact with the support means of the rack system, such as wheels 23, and plates 22, which are positioned at least at intervals along portions of each of the areas defined between the offset pads 14 and 15 and the edges of the platform 11A, and provide a surface for contact with the track, and these plates prevent damage to the plastic outer covering, under heavy loads imposed during the loading situation.

Figure 4:
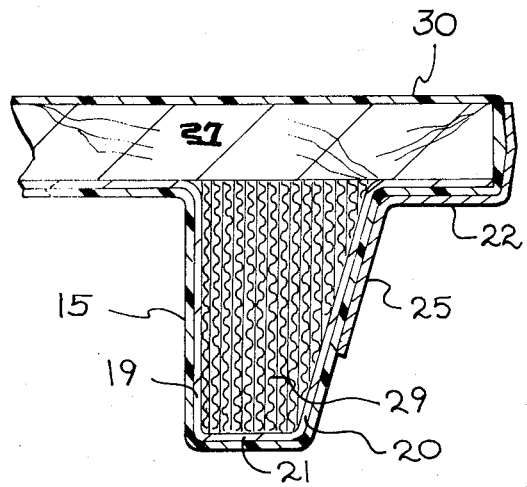
FIG. 4 is a partial cross section enlarged view of the pallet of FIGS. 1 and 2.
Figure 5:
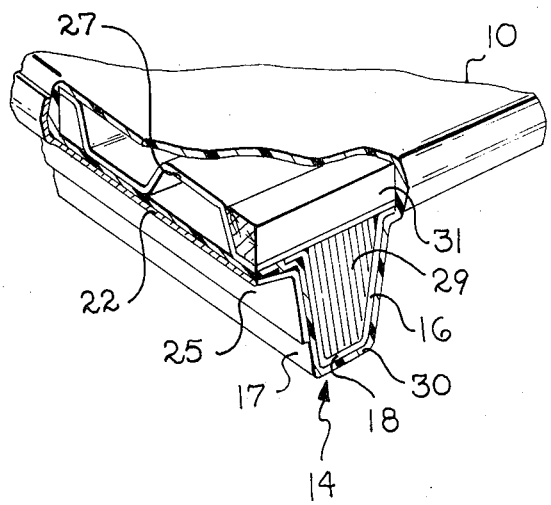
FIG. 5 is an end view of a part of the pallet of this invention with a portion of the outer cover removed, showing the reinforcing structure.
Figure 6:
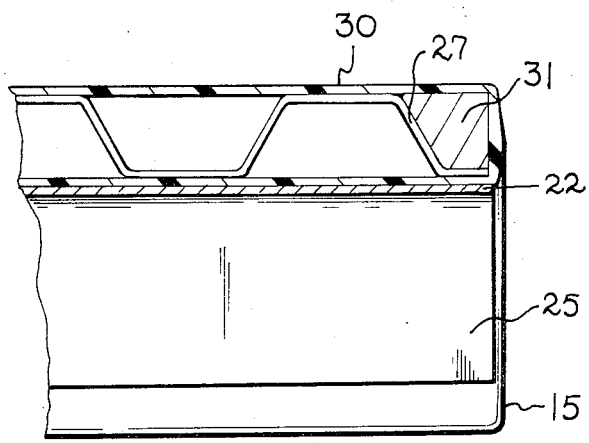
FIG. 6 is a view of a part of the pallet in cross-section, showing the reinforcing structure positioned within the outer shell.

The pallet and pad of FIGS. 1 and 2 is shown in detail, in partial section, in FIG. 4. Pallet 10 comprises platform 11, a crenelated reinforcing 27 member made from sheet material and formed with a plurality of crenelations 28, having bottom surface 12 and top surface 13. Pad 15 comprises a shell made of rigid material, attached to and integrally formed with the reinforcing member 27. The shell has sidewall 19, sloping wall 20, and bottom plate 22. A plastic wrapper 30 encloses both platform 11 and pads 14 and 15. Plates 22 are positioned on the bottom surface 13 of the platform 10, adjacent the sloping wall 17 of pad 14 and sloping wall 20 of pad 15.

Plates 22 and guides 25 make either integral or separate pieces of material.

The pads 14 and 15 have a reinforcing material 29 disposed within the pad and acting to support the pad when the pallet is resting on a floor in a load bearing condition.

In some embodiments, the shell is an integral part of the internal stiffener. In other embodiments, the shell is attached to the stiffener by welding; or in other embodiments, such as plywood, by nailing or bolting.

The shell may be reinforced with a stiffener; a preferred stiffening material is corrugated paperboard, which may also be impregnated in a foamed polyurethane plastic material.

The pallet of this invention provides for both rack loading and moving over the tracks of a rack and also for conventional fork-lift operations wherein the lifts of a fork are inserted between the pads and the pallet is moved on the lifts. When the pallet is either rack-loaded or supported on a surface such as a floor, the design provides a resistance to heavy loads and especially resistance to bending moments when the pallet is rack loaded and the load is exerting a great force, tending to flex the pallet in the middle. The pads provide both a guide and a protection for the outer plastic covering; plates provide a support surface for resting on a track and also protect from damage when in a loaded condition.

What is claimed is:

1. A pallet for use in a gravity feed track system, said pallet comprising:
   a. a load-bearing platform;
   b. supports positioned along a pair of parallel edges of the platform, each of said pads offset a distance from the corresponding edge of the platform of the pallet;
   c. a reinforcing member positioned between said platform and said pads;
   d. a plastic wrapper enclosing both the platform and the pads;
   e. each pad comprising at least one sidewall inclined at a non-perpendicular angle relative to the supporting platform;
   f. a guide positioned along at least portions of the inclined wall of said pad;
   g. supporting plates positioned along the bottom of said pallet platform between the pad and the edge of the platform; and
   h. said reinforcing member having a plurality of crenelations positioned at a nearly perpendicular angle to said supporting pads so that when said pallet is supported in a rack-loaded position, the reinforcing member resists the flexing of the pallet in the middle, under a load condition; and said guides positioned along said sloping walls guide the pallet along the track system so that the sloped walls of the pad provide both vertical and lateral positioning of the pallet relative to the track.

* * * * *